No. 785,824. PATENTED MAR. 28, 1905.
A. W. NICHOLLS.
SPRAY BATH BRUSH AND CONNECTION.
APPLICATION FILED AUG. 1, 1904.
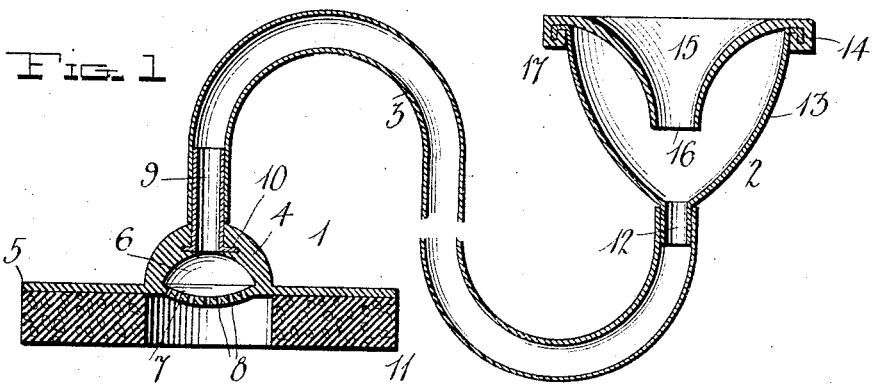
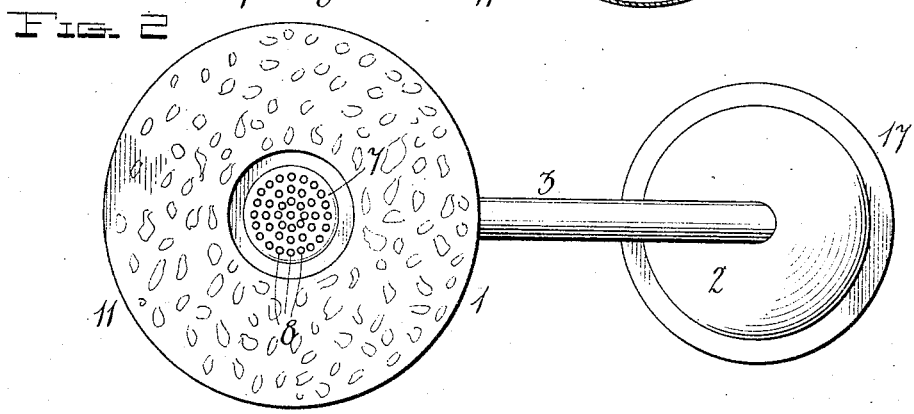
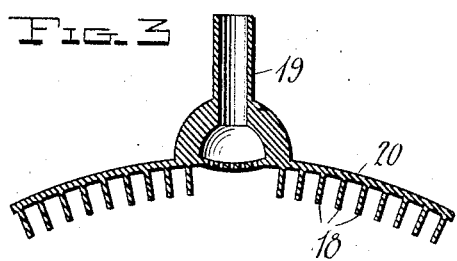
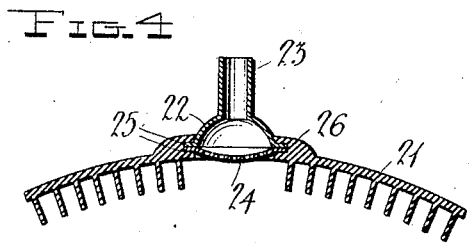
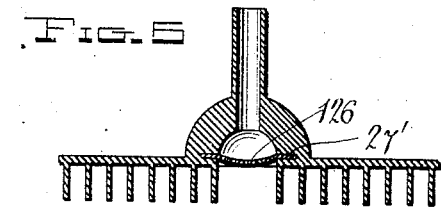
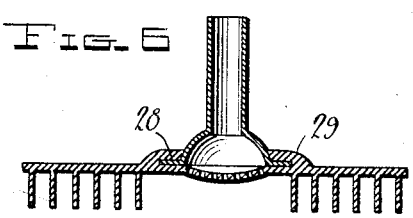
Witnesses
Inventor
Albert W. Nicholls
by H. B. Willson
Attorney No. 785,824. Patented March 28, 1905.

UNITED STATES PATENT OFFICE.

ALBERT W. NICHOLLS, OF CHICAGO, ILLINOIS.

SPRAY BATH-BRUSH AND CONNECTION.

SPECIFICATION forming part of Letters Patent No. 785,824, dated March 28, 1905.

Application filed August 1, 1904. Serial No. 219,122.

*To all whom it may concern:*

Be it known that I, ALBERT W. NICHOLLS, a citizen of the United States, residing at Chicago, in the county of Cook and State of Illinois, have invented certain new and useful Improvements in Spray Bath-Brushes and Connections; and I do declare the following to be a full, clear, and exact description of the invention, such as will enable others skilled in the art to which it appertains to make and use the same.

My invention relates to improvements in spray bath-brushes and connections for the same; and it consists in the peculiar construction, combination, and arrangement of parts hereinafter fully described and claimed.

The object of my invention is to provide a simple, durable, inexpensive, and highly-efficient spraying and rubbing device of this character which may be readily applied to a faucet of any size.

The above and other objects, which will appear as the nature of my invention is better understood, I attain by the construction illustrated in the accompanying drawings, in which—

Figure 1 is a sectional view through the spraying and rubbing device and its faucet connection. Fig. 2 is a bottom plan view of the spraying and rubbing device. Figs. 3, 4, 5, and 6 are detail sectional views through modified forms of my invention.

Referring more particularly to Figs. 1 and 2 of the drawings, the numeral 1 denotes my improved rubbing and spraying device, 2 a faucet connection, and 3 a flexible tubing connecting the latter with the former. As shown, the spraying device 1 comprises a sprinkler-head 4 in the form of a cup-like or semispherical body, which is preferably constructed of soft rubber and formed at its large end with an annular flange 5. The cavity 6 in the head 4 has its large end closed by a perforated plate 7, which, as here shown, is formed integral with the body 4 and its flange 5. Said portion 7 is curved, as shown, and its perforations 8 are disposed radially to cause the large spray, as will be readily understood. In the opposite end of the body or head 4 is an inlet connection 9, here shown in the form of a metal tube provided with an annular flange 10 upon its inner end, which flange is embedded in the head 4 to prevent movement of the tube in the same. The annular flange 5 has upon its under face a rubbing or scrubbing device 11, which, as shown in Fig. 1 of the drawings, is in the form of a rubber sponge. Said sponge, which is in the form of a flat ring surrounding the sprinkler-head, may be formed integral with the flange 5, or it may be secured thereto in any suitable manner. Upon the outer end of the tube 9 is connected one end of a flexible tube 3, preferably formed of rubber, the opposite end of which is engaged with a tubular stem 12, formed at one end of the faucet connection 2. The latter is in the form of a conical shell or cup 13, constructed, preferably, of metal and having the tube 12 at its small end and an annular outturned rim or flange 14 at its large end. Within the said shell is a funnel-shaped mouthpiece 15, which is made of soft rubber or other suitable flexible material, the smaller end 16 of which is disposed opposite the tube 12 and the larger outer edge of which is formed with an inturned annular flange 17, which engages the flange 14 of the shell and secures the mouthpiece to the shell, as will be understood.

The use and advantages of the device shown in Figs. 1 and 2 will be readily understood. The connection 2 is engaged with a faucet, the end of the faucet projecting into the elastic mouthpiece 15, which will expand to fit the faucet of any size and construction. When the water is turned on, it will jet through the openings 8 in the sprinkler-head and throw a broad spray around the rubbing device. It will be seen that the body portion 4 and the tube 9 of the sprinkler-head form a handle by means of which the device may be readily manipulated.

In Fig. 3 of the drawings I have shown a sprinkler-head provided with a rubber brush 18 instead of the sponge 11 and an integral tubular pipe or tubing connection 19 instead of the removable metal one 9. The annular flange 20 in this figure, which corresponds to the flange 5 previously described, is slightly concave upon its under side, from which the flexible rubber bristles of the brush 18 project. It will be noticed in this figure that the brushing device is made in a single piece.

In Fig. 4 of the drawings I have shown the annular flange 21 made separate from the sprinkler-head 22. Said flange 21 is constructed of soft rubber and, as shown, has a brush upon its under side; but it will be understood that any suitable rubbing device may be substituted for the brush. The sprinkler-head is constructed of metal or hard rubber and is preferably formed in two parts 23 and 24. Said parts have abutting annular flanges 25, which are embedded in a thickened central portion 26 of the flange 5.

In Fig. 5 of the drawings I have shown the annular flange, the sprinkler-head, and the pipe connection formed integral and of soft rubber and the perforated plate 126, which corresponds to the plate 7 in Fig. 1 of the drawings, formed of metal or hard rubber and secured in the sprinkler-head by having its annular flange 27 embedded in the large open end of said head. In this figure of the drawings the annular flange is flat instead of being dished or concave, as shown in Figs. 3 and 4.

In Fig. 6 of the drawings I have shown the annular flange and the perforated plate formed integral and of soft rubber and the sprinkler-head, with its pipe connection, also integral, but of metal or hard rubber. The large end of the sprinkler-head has its annular flange 28 embedded in a thickened portion 29 upon the annular flange.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A brush of the class described, having a sprinkler-head formed with a tubular portion for connection with a flexible feed-tube, a flange extending around and projecting from the sprinkler-head, and a rubbing portion on the said flange, substantially as described.

2. A brush of the class described, having a sprinkler-head provided with a tubular portion for connection with a flexible feed-tube, a flange formed integrally with and extending around the sprinkler-head, and a rubbing portion on the said flange, substantially as described.

3. A brush of the class described, having a sprinkler-head formed integrally with a tubular portion for connection with a flexible feed-tube, a flange extending around the sprinkler-head, and a rubbing portion on the said flange, substantially as described.

In testimony whereof I have hereunto set my hand in presence of two subscribing witnesses.

ALBERT W. NICHOLLS.

Witnesses:
FRED. A. FISH,
CORNELL SCHREIBER.